United States Patent [19]
Love, Jr.

[11] 3,931,902
[45] Jan. 13, 1976

[54] CABLE REEL TRANSPORT VEHICLE

[75] Inventor: Joseph W. Love, Jr., Bonner Springs, Kans.

[73] Assignee: B. H. Mfg., Inc., Kansas City, Kans.

[22] Filed: July 24, 1974

[21] Appl. No.: 491,285

[52] U.S. Cl............ 214/390; 214/77 R; 214/130 C; 214/139; 242/86.5 R; 214/DIG. 4
[51] Int. Cl.².......................................... B60P 1/48
[58] Field of Search........... 214/1 D, 130 R, 130 C, 214/139, 77 R, 86 A, 390, 392, DIG. 1, DIG. 3, DIG. 4; 242/86.5 R

[56] References Cited
UNITED STATES PATENTS

| | | | |
|---|---|---|---|
| 1,052,096 | 2/1913 | Schulze | 214/77 R |
| 2,775,357 | 12/1956 | Arment | 214/DIG. 4 |
| 2,814,394 | 11/1957 | Witcher | 214/1 D |
| 2,941,678 | 6/1960 | Keys | 214/77 R |
| 3,013,676 | 12/1961 | Daniels | 214/77 R |
| 3,522,892 | 8/1970 | Vegors | 214/86 A |
| 3,834,568 | 9/1974 | Larson et al. | 214/390 X |

FOREIGN PATENTS OR APPLICATIONS

| | | | |
|---|---|---|---|
| 1,954,704 | 5/1971 | Germany | 214/DIG. 4 |

*Primary Examiner*—Robert J. Spar
*Assistant Examiner*—Leslie J. Paperner
*Attorney, Agent, or Firm*—Fishburn, Gold & Litman

[57] ABSTRACT

A carrier for transporting heavy reels and the like includes a pair of laterally spaced, rearwardly extending, wheeled frame beams defining a rearwardly open space for receiving the reel. Uprights are secured to the beams and pivotally support hydraulically actuated, rearwardly directed elongated arms for pivotal movement in vertical planes. Reel axle support bars have upper ends hinged to the arm rear ends and are moveable with the arms from a lower lifting position to an upper transporting position.

9 Claims, 4 Drawing Figures

CABLE REEL TRANSPORT VEHICLE

This invention relates generally to trailers and more particularly to an improved carrier for lifting and conveying heavy reels of materials such as wire rope, power transmission lines, telephone cables, etc.

Various wheeled trailers have been suggested and utilized for lifting and transporting heavy reels, however heretofore such devices known to applicant have either been excessively expensive to produce and maintain, and/or awkward, unsafe or unreliable in use. By way of this invention, a reel truck is relatively inexpensive to produce and yet quickly and readily moved into position for securing and lifting a heavy reel and is adapted to safely and expeditiously transport the reel to a desired location and discharge same. This is accomplished by the use of reel axle support bars pivotally trailing from spaced arms which are, in turn, pivoted from rigid supports and moved by hydraulic cylinders, or the like.

The principle objects of the present invention are: to provide a carrier for lifting, supporting and transporting reels expeditiously; to provide a reel truck which is easily positioned for lifting or discharging the reel and capable of handling reels of various size with ease; to provide such a transporting device which is relatively inexpensive to produce but highly efficient in operation; and to provide such a device wherein the reel is safely secured and stable during transport.

Other objects and advantages of this invention will become apparent from the following description taken in connection with the accompanying drawings wherein are set forth by way of illustration and example certain embodiments of this invention.

Figure 1:
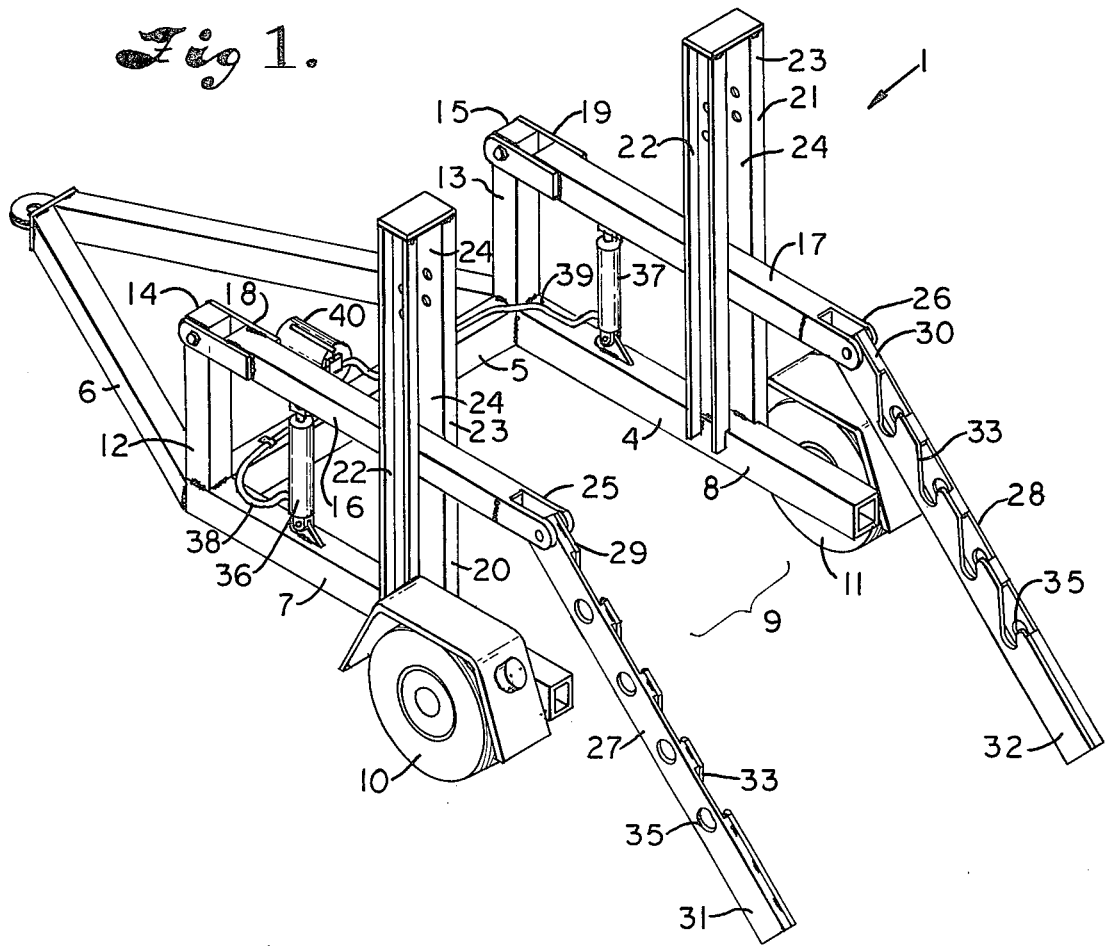
FIG. 1 is a perspective view showing a reel carrier embodying this invention.

Referring to the drawings in more detail:

The reference numeral 1 generally indicates a reel carrier adapted to elevate a reel 2 from a support surface 3 to a transporting position and back to a support surface after transport.

In this example, the carrier 1 comprises a frame 4 including a horizontally extending main cross bar 5 with a tongue 6 secured thereto and extending forwardly for conventional connection to a suitable towing vehicle (not shown). A pair of laterally spaced frame beams 7 and 8 are respectively secured to, and extend rearwardly from, opposite ends of the cross bar 5 and define a rearwardly open space 9 therebetween. Wheel assemblies 10 and 11 are mounted on the beams 7 and 8 and moveably support same above the ground in conjunction with the towing vehicle (not shown) as best illustrated in FIG. 1.

A pair of laterally spaced structural uprights 12 and 13 form part of the frame 14 and are secured thereto near the intersections of the beams 7 and 8 with the cross bar 5. The uprights 12 and 13 have upper ends 14 and 15 projecting an equal distance above the beams 7 and 8. Elongated arms 16 and 17 respectively extend roughly horizontally over the beams 7 and 8 and have forward ends 18 and 19 pivotally hinged to the upright ends 14 and 15 for pivotal movement in vertical planes.

A pair of rigid, laterally spaced guide assemblies 20 and 21 are secured to the respective beams 7 and 8 rearwardly of the uprights 12 and 13 and extend upwardly from the beams as best illustrated in FIG. 1. The guide assemblies 20 and 21, in this example, are composed of channels 22 and 23 spaced apart laterally and secured at the upper ends so as to provide an elongated vertically extending slot 24 therebetween. The respective arms 16 and 17 project through the slot 24 whereby the arcuate movement of the arms 16 and 17 is restricted generally to the vertical planes containing the beams 7 and 8 and lateral movement is prevented. The arms 16 and 17 terminate in rear ends 25 and 26 which, in this example, form a clevis for receiving additional structure described below.

Figure 2:
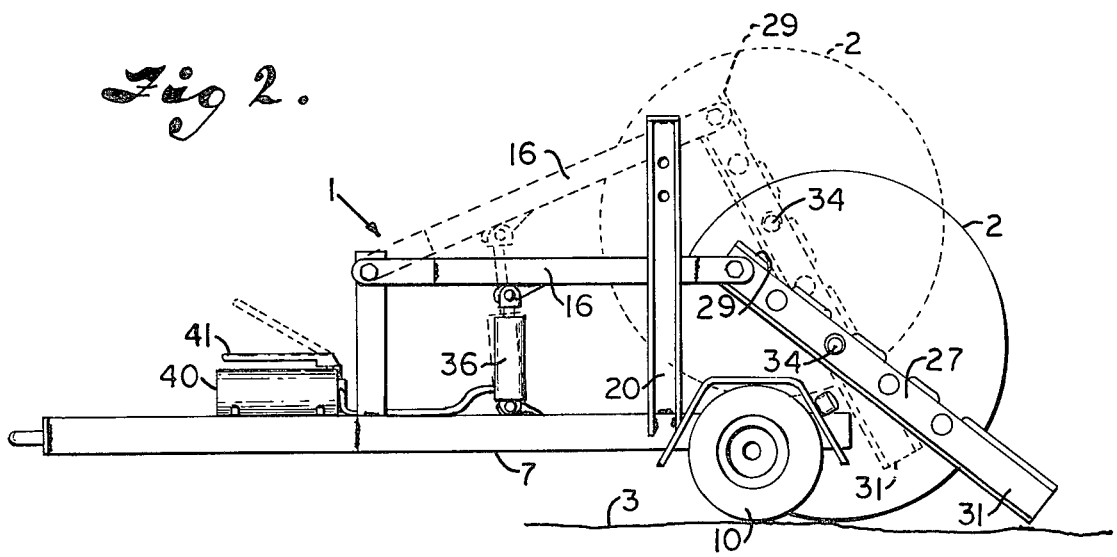
FIG. 2 is a side elevational view of the carrier showing, by broken lines, support structure in an elevated or transporting position.

Elongated support bars 27 and 28 respectively have upper ends 29 and 30 hinged to the arm rear ends 25 and 26 and lower ends 31 and 32 moveable from a ground contacting position such as shown by the solid line representation in FIG. 2 to a position suspended above the ground shown by the broken line representation in FIG. 2. The movement of the bars 27 and 28 is in response to the arcuate movement of the arms 16 and 17 within the slots 24 as noted above.

Figure 4:
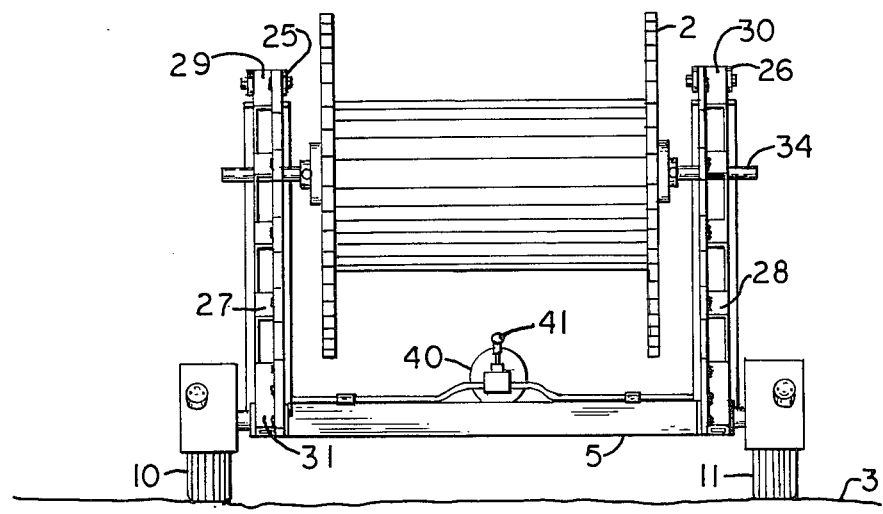
FIG. 4 is a rear elevational view of the carrier showing a cable reel in elevated position.

The support bars 27 and 28 are generally of box construction and each has a line of upwardly open, spaced apart notches 33 therealong adapted to receive opposite ends of an axle shaft 34 extending through the reel 2. Aligned with the respective notches 33 are openings 35 which, when necessary, permit the shaft 34 to extend laterally beyond bars 27 and 28, as best illustrated in FIG. 4.

Generally vertically directed hydraulic cylinders 36 and 37 are, in this example, pivotally mounted between the respective beams 7 and 8 and arms 16 and 17 and are operative to pivot the arms through the noted arc, thereby raising the bars 27 and 28 and reel 2 off the ground to an elevated position within the open space 9. The cylinders 36 and 37 are fed through hydraulic lines 38 and 39 which transmit fluid from a suitable manual pump 40 which is mounted on the cross bar 5. The lines 38 and 39 are not isolated from each other, but, rather, are interconnected at the pump 40 whereby fluid pressure in the respective lines tend toward equalization. The lever system between the cylinders and arms 16 and 17 are such that when one of the arms 16 or 17 tends to become elevated above the other arm, the pressure in the further-extended cylinder 36 or 37 will tend to rise above the opposite cylinder. The fluid in the higher pressure cylinder will then flow toward the other cylinder, causing the arms 16 and 17 to be substantially self-leveling with each other.

In operation, the carrier may be backed to a ground resting reel 2 and the arms 16 and 17 lowered to the position shown in solid lines in FIG. 2. One set of notches 33 or openings 35 are selected for securing the reel axle shaft and, through manual reciprocation of the pump handle 41, one person may easily raise the arms 16 and 17 to the position indicated by the broken lines in FIG. 2. Due to the arcuate path taken by the arms 16 and 17, the reel 2 is urged both upwardly and toward the front of the carrier where the axle shaft 34 approaches a position above the wheel assemblies 10 and 11.

Figure 3:
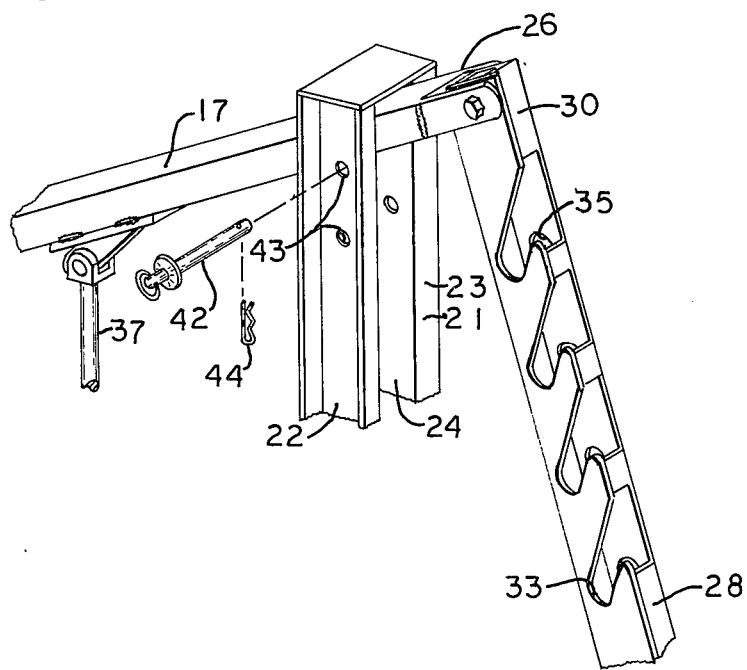
FIG. 3 is a fragmentary perspective view on an enlarged scale showing details of the supporting structure.

For transport, it is desirable to lock the arms 16 and 17 in elevated position and relieve pressure on the pump 40 and cylinders 36 and 37. This is accomplished, in this example, by means of a suitable pin 42 which is directed through openings 43 in the guide assembly beams 22 and 23, as shown in FIG. 3. A locking clip 44 is preferably used to prevent vibration and shock from dislodging the pin 42.

After arrival at the desired destination, the pump 40 is utilized to slightly raise the arms 16 and 17 so that the pins 42 may be withdrawn and then the arms 16 and 17 are lowered by suitable conventional controls on the pump 40, whereupon the reel 2 to comes to rest upon the ground within the space 9. In the alternative, the carrier may be used to hold the reel in elevated position from which the cable, etc., may be payed out.

It is to be understood that, although one form of this invention has been illustrated and described, it is not to be limited thereto except insofar as such limitations are included in the following claims.

What I claim and desire to secure by Letters Patent is:

1. A wheeled carrier for transporting reels and the like comprising:
   a. a frame having a laterally extending main cross bar and a pair of laterally spaced beams secured to and extending rearwardly from said cross bar, said beams defining a rearwardly open space therebetween,
   b. a pair of laterally spaced uprights secured to said beams near said cross bar and having upper ends projecting above said beams,
   c. a pair of elongated arms respectively extending over said beams and having rear ends and forward ends, said forward ends being pivotally connected to said upright upper ends for arcuate movement of said arms in vertical planes,
   d. a pair of elongated, rigid support bars respectively having upper ends hinged to said arm rear ends and lower ends, said support bars being movable from a lower position to an upper position in response to the arcuate movement of said arms, said support bars angling downwardly and rearwardly from said arm rear ends and being movably supported near said bar lower ends by said frame when said support bars are in said upper position,
   e. Means associated with said support bars to receive and support opposite ends of a cable reel axle shift, and
   f. means selectively urging said arms through said arcuate movement.

2. A carrier as defined in claim 1 including:
   a. guide members secured to said beams and restricting said arms to said arcuate movement.

3. A carrier as defined in claim 1 wherein:
   a. said urging means are hydraulic cylinders connected between said beams and said arms.

4. A carrier as defined in claim 3 wherein:
   a. said hydraulic cylinders are fed hydraulic fluid through interconnected supply lines.

5. A carrier as defined in claim 1 wherein:
   a. said means associated with said support bars comprise upwardly open notches.

6. A carrier as defined in claim 1 wherein:
   a. said means associated with said support bars comprise laterally directed openings.

7. A carrier as defined in claim 1 wherein:
   a. said support bar lower ends are movable from a ground contacting position to an elevated position in response to the arcuate movement of said arms.

8. A wheeled carrier for transporting reels and the like comprising:
   a. a frame, support means on said frame and adapted for elevation with respect to said frame,
   b. a pair of elongated, rigid laterally spaced apart support bars respectively having an upper end portion pivoted to said support means and a lower end portion angling downwardly and rearwardly from said upper end portion, said support bars being movable by elevation of said support means from a lower position where said bar lower end portion trails on the ground to an upper position where said support bar is movably supported near said bar lower portion by said frame, and
   c. axle securing means spaced along said support bars.

9. A carrier for transporting reels and the like and adapted to transfer a reel from a support surface onto the carrier and from the carrier to a support surface comprising:
   a. a frame having an horizontally extending main cross bar, a tongue secured to and extending forwardly of said cross bar for connection to a towing vehicle, a pair of laterally spaced beams secured to and extending rearwardly from said cross bar and defining a rearwardly open space therebetween,
   b. wheel assemblies secured respectively to said beams and movably supporting same above the ground,
   c. a pair of laterally spaced uprights secured to said beams near said cross bar and having upper ends projecting above said beams,
   d. a pair of elongated arms respectively extending over said beams and having forward ends pivotally connected to said upright upper ends for pivotal movement in vertical planes containing said beams,
   e. a pair of rigid, laterally spaced guide members secured to said beams rearwardly of said respective uprights and extending upwardly from said beams, said arms respectively projecting through said guides and terminating in rear ends movable in an arc about said upright upper ends, said guide members, restricting lateral movement of said arms,
   f. a pair of elongated, rigid support bars respectively having upper ends hinged to said arm rear ends and lower ends, said support bars angling downwardly and rearwardly from said arm rear ends, said support bar lower ends being movable from a ground contacting position to a position suspended above the ground, said support bars being movably supported near said support bar lower ends by said beams in response to the arcuate movement of said arms to a position where said support bar lower ends are above the ground,
   g. said support bars each having means thereon adapted to receive and support opposite ends of the axle shaft of a ground resting cable reel, and
   h. upwardly directed hydraulic cylinders pivotally mounted between said respective beams and arms and adapted to move said arms through said arc.

* * * * *